(12) United States Patent
Regunathan et al.

(10) Patent No.: US 11,277,199 B1
(45) Date of Patent: Mar. 15, 2022

(54) POWER CONTROL FOR FREQUENCY VARIATION AND GATEWAY SWITCHING

(71) Applicants: Murali Regunathan, Washington, DC (US); Shivika Pathania, Germantown, MD (US)

(72) Inventors: Murali Regunathan, Washington, DC (US); Shivika Pathania, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 17/083,542

(22) Filed: Oct. 29, 2020

(51) Int. Cl.
*H04B 7/185* (2006.01)

(52) U.S. Cl.
CPC ..... *H04B 7/18513* (2013.01); *H04B 7/18517* (2013.01); *H04B 7/18528* (2013.01)

(58) Field of Classification Search
CPC .............................................. H04B 7/185–195
See application file for complete search history.

(56) References Cited

U.S. PATENT DOCUMENTS

| 6,085,067 A | 7/2000 | Gallagher et al. | |
| 10,243,651 B1* | 3/2019 | Le | H04B 7/18543 |
| 2013/0109299 A1* | 5/2013 | Roos | H04B 7/18513 |
| | | | 455/12.1 |
| 2016/0191148 A1* | 6/2016 | Harrington | H04B 7/18528 |
| | | | 370/316 |
| 2016/0278064 A1* | 9/2016 | Marsh | H04W 72/046 |
| 2020/0344702 A1* | 10/2020 | Regunathan | H04W 52/241 |
| 2020/0351795 A1* | 11/2020 | Regunathan | H04W 52/243 |

FOREIGN PATENT DOCUMENTS

| EP | 8337058 A1 | 6/2018 |
| WO | 2016164639 A1 | 10/2016 |

OTHER PUBLICATIONS

International Search Report for PCT Application No. PCT/US2021/071711.

* cited by examiner

*Primary Examiner* — Raymond S Dean
(74) *Attorney, Agent, or Firm* — Capitol City Techlaw; Jasbir Singh

(57) ABSTRACT

A system and method for managing a transmit power of a terminal includes dividing a spectrum into frequency bins and an inroute layout including inroutes; mapping at least one of the frequency bins with each of the inroute; determining a respective normalized Transmit Power (TP) for each of the frequency bins; calculating a transmission TP based on the respective normalized TP of one or more of the frequency bins mapped to a selected inroute; and transmitting a radio signal with the transmission TP on the selected inroute. A first frequency bin is adjacent a second frequency bin, a respective normalized TP of the first frequency bin compared to a respective normalized TP of the second frequency bin varies no more than a threshold power delta, a count of frequency bins is greater than one and unequal to a count of the inroute layout.

20 Claims, 5 Drawing Sheets

| Frequency Bin (Fbin) | GW Start Frequency (downlink) | GW Stop Frequency (downlink) | IR | TPfbin (dB) | PAF fbin (dB) $PAFfbin_i = TPfbin_i - TPfbin_{ref}$ |
|---|---|---|---|---|---|
| 1 | a | b | 1 | 6 | 2 |
| 2 | c | d | 2,3 | 5 | 1 |
| 3 (Reference) | e | f | 4,5 | 4 | 0 |
| 4 | g | h | 5 | 5 | 1 |
| 5 | m | n | 6,7,8,9 | 5 | 1 |
| | | | | | |

POWER CONTROL FOR FREQUENCY VARIATION AND GATEWAY SWITCHING

BACKGROUND

The prior art uses an initial power estimation process called ranging (not to be confused with the distance estimation process). Ranging allows the terminal to establish the power required for different Symcods. Any gradual change to this power requirement is tracked using a feedback from the gateway. Large step changes (~>1 dB) to the power requirement usually lead to repeating the ranging procedure. The repeating of the ranging process is time and resource wasteful. Combating large step changes using precalculated values raises the following issues:

- link budget information is not available for most systems and uses a lot of assumptions leading to inaccuracies;
- variations in the values is not tracked over time; and
- the inroutes (IRs) layout needs to be fixed.

The limitations of the existing design arise mostly from assuming many time variant parameters to be static. Time variant parameters that change rapidly and introduce a step change in power, like operational frequency or modulation, cause the most problems in the existing design. Furthermore, during a gateway switch, the prior art needs to go through ranging for all the terminals subject to the switchover. This ranging is extremely time consuming and delays the switch by minutes. The present teachings reduce or eliminate this time consumption and delay associated with gateway switching.

BRIEF SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

The present teachings disclose elements in a radio terminal power control to combat any variation in required transmit Power Across Frequency. This variation arises from multiple sources including hardware performance, propagation losses, system interference, gateway switchover and the like. The present teachings disclose a radio terminal power control initialization method and system based on measurement and not on pre calculated values. The present teachings disclose a tracking and feedback method and system that gains better accuracy of the terminal power control values over time. Since the values are computed over frequency bins and not individual IRs, the IR layout can also be changed. The present teachings disclose elements that help in power control during a gateway switchover. The difference between the necessary transmit powers for the two gateways being switched between is derived from measurements and used to implement the change in power.

A method for managing a transmit power of a terminal is disclosed. The method includes dividing a spectrum into frequency bins and an inroute layout including inroutes; mapping at least one of the frequency bins with each of the inroute; determining a respective normalized Transmit Power (TP) for each of the frequency bins; calculating a transmission TP based on the respective normalized TP of one or more of the frequency bins mapped to a selected inroute; and transmitting a radio signal with the transmission TP on the selected inroute. In the method, a first frequency bin of the frequency bins is adjacent a second frequency bin of the frequency bins, a respective normalized TP of the first frequency bin compared to a respective normalized TP of the second frequency bin varies no more than a threshold power delta, a count of frequency bins is greater than one and unequal to a count of the inroute, and each respective normalized TP includes a Power Across Frequency (PAF) initial value for a frequency range of a respective frequency bin of the frequency bins.

In other embodiments, the method may include one or more of the following features. The method wherein the threshold power delta ranges from 0.2 decibel (dB) to 0.8 dB and a power difference across a PAF curve of the frequency range of each of the frequency bins is within 0.0 dB to 0.5 dB. The method wherein the determining includes calculating the PAF initial value as a mean of a PAF curve for the frequency range of the respective frequency bin. The method wherein the selected inroute is mapped to a plurality of the frequency bins and the calculating of the transmission TP combines each of the respective normalized TPs of the plurality of the frequency bins.

In some embodiments, the method may include switching the transmitting between a first selected inroute and a second selected inroute; and adjusting the transmission TP prior to the switching, wherein the selected inroute includes the first selected inroute and the second selected inroute, the radio signal includes a first portion transmitted via the first selected inroute and a second portion transmitted via the second selected inroute; and at least one of the frequency bins mapped to the first selected inroute is different than at least one of the frequency bins mapped to the second selected inroute. In some embodiments, the method may include combining a legacy power control system TP with the respective normalized TP to calculate the transmission TP. The method wherein the respective normalized TP for each of the frequency bins includes a PAF tracking value to counter differences between the respective PAF initial value, a terminal PAF and a variation during operation. The method wherein the respective normalized TP for each of the frequency bins includes a relative TP from a reference frequency bin of the frequency bins. The method wherein the inroute layout, the frequency bins or a combination thereof are reconfigured during system operation.

In some embodiments, the method may include receiving, from a gateway, one or more of the frequency bins, the inroute layout, the respective normalized TP for the frequency bins, or a combination thereof. In some embodiments, the method may include receiving, from a gateway, mapping of frequency bins, PAF initial values and PAF tracking values, wherein the PAF tracking values are based on calculating a mean of PAF tracking values reported by a terminal.

In some embodiments, the method may include collecting, at a gateway, a plurality of PAF tracking value for each of the frequency bins; and computing a mean of the plurality of PAF tracking values for each of the frequency bins. The method may include setting the PAF initial value of a respective frequency bin based on a respective computed PAF tracking value and subsequently resetting the respective computed PAF tracking value. The method wherein the gateway polls an active terminal for its PAF tracking values and calculates mean tracking values. In some embodiments, the method may include receiving, from a gateway, a mapping of gateways, frequency bins and power delta values between gateways, wherein the power delta values are used after a gateway switchover.

Additional features will be set forth in the description that follows, and in part will be apparent from the description, or may be learned by practice of what is described.

BRIEF DESCRIPTION OF THE SEVERAL VIEWS OF THE DRAWINGS

In order to describe the manner in which the above-recited and other advantages and features may be obtained, a more particular description is provided below and will be rendered by reference to specific embodiments thereof which are illustrated in the appended drawings. Understanding that these drawings depict typical embodiments and are not, therefore, to be limiting of its scope, implementations will be described and explained with additional specificity and detail with the accompanying drawings. To easily identify the discussion of any particular element or act, the most significant digit or digits in a reference number refer to the figure number in which that element is first introduced. Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Figure 1:
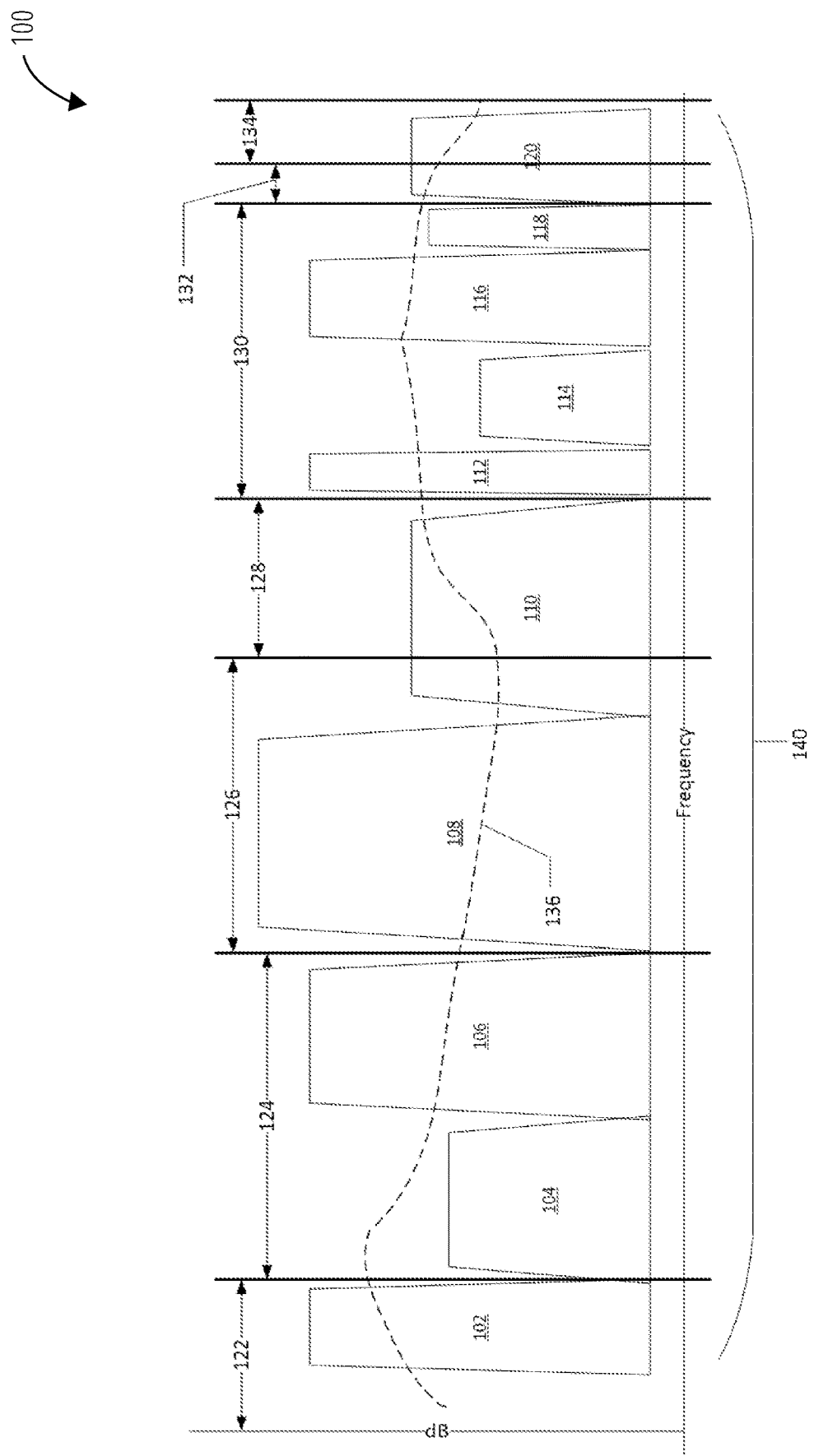
FIG. 1 illustrates exemplary inroutes (IRs) distributed into frequency bins and a transmit power across frequency bins according to various embodiments.

The present teachings disclose a radio terminal power control initialization system and method based on measurement and not on pre calculated values. The present teachings disclose a tracking and feedback system and method that gains accuracy of the terminal power control values over time. The present teachings disclose a radio terminal power control system to assist during a gateway switchover.

The present teachings may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

INTRODUCTION

A Very Small Aperture Terminal (VSAT) communicates with a gateway via a satellite. An uplink is a link to the satellite (either from the gateway or the VSAT) and a downlink is the link from the satellite (either from the gateway or the VSAT). Inbound and Outbound are often referred to as Inroute (IR) and Outroute (OR). The OR is from the gateway to the VSAT and the IR is from the VSAT to the gateway.

Terminal power control addresses the terminal uplink power required to maintain a certain Signal to Noise Ratio (SNR) at the gateway such that the packet error rate remains constant. Many applications rely on the error rate being above a minimum threshold for their proper functioning. The burst SNR at the gateway depends on time variant and time invariant factors. In any given network, factors that can usually be considered static are satellite hardware, gateway hardware, gateway location, terminal hardware etc. Factors like total system interference, thermal noise, hardware performance change gradually over the system lifetime, whereas others like link conditions, operational frequency or modulation change fast. Exemplary parameters that impact the power requirement for a radio terminal are:

TABLE 1

PARAMETERS AFFECTING REQUIRED TERMINAL POWER

| | Parameter | Time sensitivity | Description | Prior Art | Present Teachings |
|---|---|---|---|---|---|
| 1 | Operating Receiver SNR/Receiver sensitivity | Static | Varies based on based on Forward Error Coding (FEC) and Modulation and Error rate but does not change with time | Static | Static |
| 2 | Frequency of operation | Frequent, sudden discrete changes | Varies based on symbol rate. In a High Throughput System (HTS) the range of operation can be very large | Assumed fixed | Constantly changing |
| 3 | Terminal Location | Static or gradually moving | For fixed Very Small Aperture Terminals (VSATs), the location is static whereas for mobile ones like Aeronautical, the location changes gradually | Assumed fixed | Varying |
| 4 | Gateway Location | Static | Static | Static | Change due to gateway switching |
| 5 | Satellite Location | Static | A GEO satellite moves very little to have an impact on the path loss or changing beam patterns; a LEO/MEO satellite moves enough, and fast enough to impact power control | Static | GEO Sat Static |
| 6 | Terminal Hardware | Gradual | Different combinations of antenna/radio/cables; temperature, aging etc. introduces a change | Static | Static |
| 7 | Gateway Hardware | Gradual | Different combinations of antenna/radio/cables; temperature, aging etc. introduces a change | Static | Change due to gateway switching |
| 8 | Satellite Hardware | Gradual | Temperature, aging etc. introduces a change | Static | Static |
| 9 | Satellite beam patterns | Rapid | Pointing errors introduce rapid fluctuations; LEO/MEO satellite motion introduces a rapid change | Static | Varying for pointing error but not LEO motion |

TABLE 1-continued

PARAMETERS AFFECTING REQUIRED TERMINAL POWER

| Parameter | Time sensitivity | Description | Prior Art | Present Teachings |
|---|---|---|---|---|
| 10 Thermal Noise | Gradual | Thermal noise changes diurnally and seasonally as well as when components age | Static | Static |
| 11 System Interference | Gradual | Co channel interference from co-polarization, cross-polarization and adjacent satellite sources | Static | Change due to gateway switching and frequency |
| 12 Adjacent channel interference (ACI) gateway Sat | Rapid | Interference from neighboring frequency carriers | Static | Varying randomly and rapidly |
| 13 Link Atmospheric effects | Rapid | Rain and atmospheric scintillation | Static | Varying |
| 14 Sat Terminal link atmospheric affects | Rapid | Rain and atmospheric scintillation | Varying | Varying |
| 15 Errors | Rapid | Measurement and power setting errors | Varying | Varying |

A lot of these parameters may change suddenly to a completely different value. The satellite or gateway may suddenly change if the terminals are moved to a different satellite or gateway for example. This changes multiple parameters, for example, the hardware, location of the satellite, the location of the gateway, the gateway-satellite link properties and the Satellite-Terminal link properties.

Power Across Frequency (PAF)

As in every large step change of SNR, the terminal could perform "ranging" at every IR to measure the transmit power required, but that would be extremely time consuming and resource wasteful. Instead, the terminal ranges on one IR and using the PAF values estimates the power required for the other IRs. In the current design, the PAF values are termed as IC [[please define]] values and are pre-calculated using link budget data. This introduces two main constraints Link budget data is unavailable for some networks The pre-calculated PAF values are static in time The present teachings solve these challenges by using measured data instead of link budget data to calculate an initial set of PAF values and a tracking system that allows the PAF values to adapt to the variations in the system. The initial set of PAF values are added to the output of the tracking system during a provisioning of the terminal.

FIG. 1 illustrates an exemplary inroute layout distributed into frequency bins and a transmit power across frequency bins according to various embodiments.

The transmit power required by a terminal to maintain a certain SNR at the gateway varies across frequency due to the performance of various hardware components being frequency dependent and due to the frequency dependence of the atmospheric losses. Since the transmit frequency of the terminal changes often and suddenly (parameter 2 of Table 1), any large changes in the SNR at the gateway cannot be regulated by the power control algorithm. A spectrum 100 may be divided into an inroute layout 140. The spectrum 100 may be distributed into frequency bins 122, 124, 126, 128, 130, 132 and 134. The frequency bins 122, 124, 126, 128, 130, 132 and 134 need not be contiguous. The inroute layout 140 may include IRs 102, 104, 106, 108, 110, 112, 114, 116, 118 and 120. The IRs 102, 104, 106, 108, 110, 112, 114, 116, 118 and 120 need not use contiguous frequencies. The inroute layout 140 may be associated with the frequency bins.

In this example, IR 102 may be associated with frequency bin 122; IRs 104, 106 may be associated with frequency bin 124; IRs 108, 110 (only a portion of IR 110) may be associated with frequency bin 126; IR 110 may be partially allocated to and associated with frequency bin 128; IRs 112, 114, 116, 118 may be associated with frequency bin 130; and IR 120 may be associated with frequency bins 132 and 134. The IRs 102, 104, 106, 108, 110, 112, 114, 116, 118 and 120 may be of different capacities, for example, 512 ksps, 1 Msps, 2 Msps, 4 Msps, 24 Msps, or the like. The IRs 102, 104, 106, 108, 110, 112, 114, 116, 118 and 120 may support various modulation codings, for example, 8 PSK 4/5, QPSK 9/10, 16 APSK 4/5, or the like.

Each of the IRs 100 may have one or more preferred transmit Power Across Frequency (PAF). A preferred transmit power for IR 102, IR 104 and IR 106 may, for example, be 'a' dB, 'a'−2 dB and 'a'+1 dB, respectively. A PAF initial value curve 136 represents a desired TP for a frequency range of the spectrum 100.

PAF Initialization

There are multiple ways to obtain an initial set of PAF values. Two different procedures are described, and comparisons presented. Since the symbol rate of the IRs range across a broad spectrum, for example, from 512 ksps (kilo symbols per second) to 24 Msps (Mega symbols per second), their occupied bandwidths can vary drastically. Multiple smaller sized IRs adjacent in frequency might not see any power variation whereas a single 24 Msps IR might see some variation across. Hence it may be insufficient to have a single PAF value for every IR. The PAF values may have to be recalculated if the IR layout is changed.

Frequency Bins

The spectrum 100 (contiguous or not) may be split into smaller, variable sized frequency bins. Each frequency bin may have a corresponding start and end gateway downlink frequency and a corresponding polarization. The PAF values may be calculated for each of the frequency bins. The frequency bin may have one or more IRs, for example, frequency bin 124. The frequency bin may even have a partial IR, for example, frequency bin 126. An IR can be part of one or more frequency bins, for example, IR 110. The PAF value may represent the PAF for the center of the frequency bin.

The frequency bins may be variable or fixed in size and may be numbered in ascending order starting with the one at the lowest frequency. The frequency bins may not have any overlapping spectrum between them, and all of the spectrum should be a part of the frequency bins. Each beam has a unique set of bins. In some embodiments, no frequency bins may cover radio frequencies across two or more beams. The frequency bins may be any size, for example, as small as 100 kHz to as big as 50 MHz. This permits flexibility and precision to define the PAF values for a wide range of networks. In portions of the spectrum where the power variation is changing gradually, a large sized frequency bin may be used, whereas in portions of the spectrum where the power variation is changing rapidly, a smaller sized frequency bin may be used. In some embodiments, the compensation in power can only be done between frequency bins and not within. The power difference within a frequency bin is preferably not excessive, for example, the power difference across a PAF curve of the frequency range of the frequency bin is within 0.0 dB to 0.5 dB, for example, 0.25 dB. In some embodiments, a threshold power delta and hence the power variation across two adjacent bins is not too large. In exemplary embodiments the threshold power delta may range between 0.2 dB to about 1 dB, for example, 0.5 dB. For example, $PAFfbin_k-PAFfbin_{k-1} \leq$ threshold power delta. This is provided the adjacent bins are contiguous. The frequency bins may be numbered uniquely for each gateway and one polarization. A frequency bin's number may increase with increase in the frequency.

The network installers and operators may not know the trend of the power variation across frequency before setting up the bins to meet the above caveats. In such a scenario, a preliminary set of frequency bins, such as equispaced 2 MHz size bins, may be formed, and the PAF values measured as detailed below. If the difference in PAF between certain adjacent bins is greater than 1 dB, then the adjacent bins should be split into two or more bins, preferably equal size bins. The number of bins split from the two adjacent bins should be greater than the difference in PAF values between the two. It is also advisable (but not necessary) to combine the adjacent bins where the difference in PAF value is less than 0.25 dB. Once the new set of frequency bins are formed the measurements may be done again and a new table formed.

Mapping IRS to Frequency Bins

Figures 2, 3:
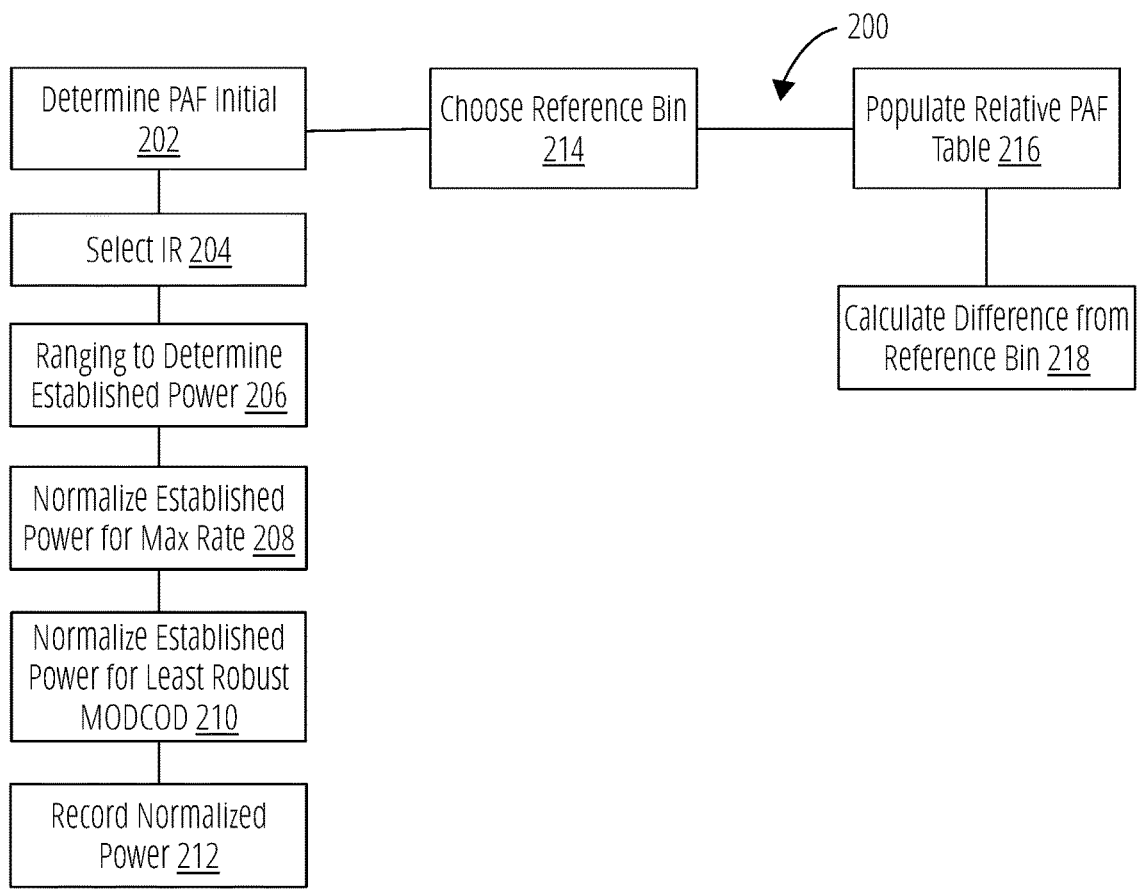
FIG. 2 illustrates an exemplary method for determining PAF values by frequency bins according to various embodiments.
FIG. 3 illustrates an aspect of the subject matter in accordance with one embodiment.

The mapping of IRs to the frequency bins may be done by the terminal with the frequency bin and IR high and low frequency definitions. Some simple rules may be followed to obtain this map. An IR may be considered part of those frequency bins where at least 10% of the bin is occupied by the IR. So, if the IR is wholly contained within a frequency bin, the IR may be mapped to that frequency bin. In some cases, even if an IR is part of multiple frequency bins, it may only be part of one frequency band as less than 10% of the frequency band is within one of the multiple frequency bins. The PAF values of all the corresponding bins may be updated and used. In other words, $IR_p \in fbin_q$, if $f_{low_{IR_p}} > f_{low_{fbin_q}}$ and $f_{high_{IR_p}} <$ $f_{high_{fbin_q}}$ else if $f_{low_{IR_p}} > f_{low_{fbin_q}}$ and $(f_{high_{IR_p}} - f_{low_{IR_p}}) >$ $0.1 * (f_{high_{fbin_q}} - f_{low_{fbin_q}})$ else if $f_{high_{IR_p}} <$ $f_{high_{fbin_q}}$ and $(f_{high_{IR_p}} - f_{low_{IR_p}}) > 0.1 * (f_{high_{fbin_q}} - f_{low_{fbin_q}})$ Measurement at System Startup FIG. 2 illustrates an exemplary method for determining PAF values by frequency bins according to various embodiments.

After the gateways are installed and the test terminals (health monitors) are installed in different user beams, measurement for forming the PAF values can be done according to method 200. Method 200 may be performed for every user beam being served by every gateway to complete a transmit power measurement across the entire spectrum of the network.

A method 200 for determining PAF values by frequency bins includes operation 210 to populate the power table. As such, operation 210 performs operations 212, 214, 216, 218 and 220 for every frequency bin ($fbin_j$) in the user beam spectrum. Operation 210 includes operation 212 to select an Inroute ($IR_k$) belonging to frequency bin $fbin_j$. The $IR_k$ selected should be close to the center of the bin. Operation 210 includes operation 214 to perform ranging for the most robust Modcod at $IR_k$ to establish the power required for the target SNR. Let this value be:

TPIRkModCodmSymbolRateS=MaxPower−AttenuationPIRkModCodmSymbolRateS

Operation 210 includes operation 216 to normalize $TP_{IRk}ModCod_m$SymbolRateS for max symbol rate in system, for example, 24 Msps. Let this value be:

$TPIR_kModCod_m$=$TPIR_kModCod_m$SymbolRate$_s$−
10*log$^{10}$(SymbolRateS/SymbolRate$_{max}$)

Operation 210 includes operation 218 to normalize $TPIR_kModCod_m$ for least robust ModCod from the trajectory table. Let this value be:

$TPIR_k$=$TPIR_kModCod_m$SymbolRate$_s$−SNRTarget−Modcod$_m$+SNRTargetModCod$_{leastrobust}$ Operation 210 includes operation 218 to record this result of power as $TP_{fbinj}$=$TP_{IRk}$. This is the TPfbin (dB) column of FIG. 5.

The method 200 may include operation 222 to choose one of the frequency bins to be a reference bin. The method 200 may include operation 230 to populate a relative PAF table 230. For every frequency bin (fbinj) in the user beam spectrum, operation 230 may perform operation 232. Operation 232 may calculate the difference of $TP_{fbinj}$ with $TP_{fbinref}$ to calculate $PAF_{fbinj}$=$TP_{fbinj}$−$TP_{fbinref}$. $PAF_{fbinj}$ may be recorded as the PAF value for the bin i. This is the PAF fbin (dB) column of FIG. 3.

FIG. 3 illustrates an exemplary PAF value table for frequency bins according to various embodiments.

FIG. 3 illustrates exemplary PAF values for some of the IRs and frequency bins depicted in FIG. 1. The PAF table 300 includes a frequency bin 302, a frequency range 304, a mapped IRs 306, a TP 308, and a delta TP 310).

In some embodiments, instead of recording a Transmit Power (TP) for a frequency bin in the table of FIG. 3, attenuation or back off values for the TP (delta TP 310) may be recorded in the table of FIG. 3. The PAF values may be calculated as a difference in attenuation between a reference frequency bin and a corresponding bin. In some embodiments, the reference frequency bin may include a ranging IR (in other words, the IR used for ranging). Once the PAF table is created at startup (or provisioning, system initialization, updated with a periodicity), these values may be distributed to the terminals. The gateway may send the PAF value for each bin and the mapping of the IR to one or more frequency bins in one or more messages.

PAF Tracking at the Terminal

Each terminal may use a PAF Tracking filter (PaFTraF) to counter differences between the PAF initial values distributed by a gateway, the terminal PAF and any variations over the system lifetime. The magnitude of the variations usually may be smaller compared to the initial values. The combined PAF initial value and PAF tracking value may be used by the terminal to compensate for any changes in Power Across Frequency.

Figure 4:
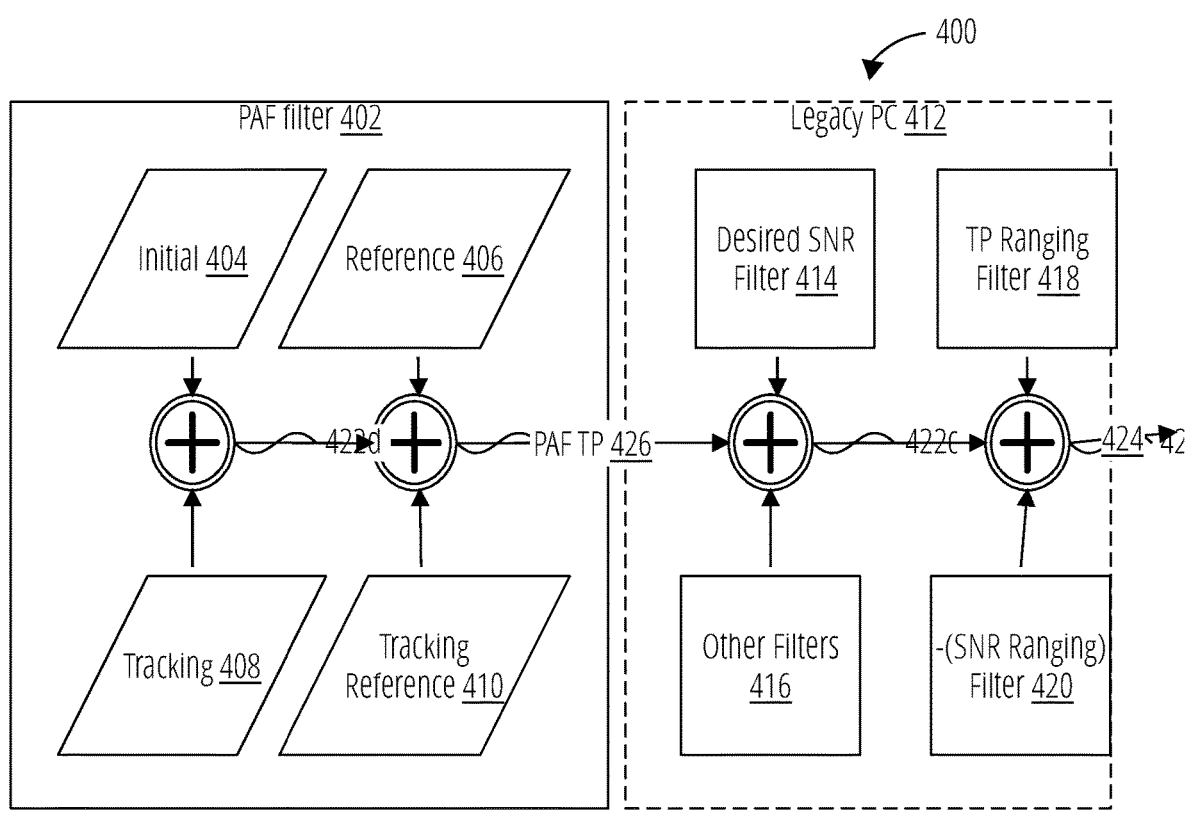
FIG. 4 illustrates a terminal power control for controlling Power Across Frequency according to various embodiments.

FIG. 4 illustrates a terminal power control for controlling Power Across Frequency according to various embodiments.

A terminal power control 400 includes a PAF filter 402, a PAF Initial Values 404, a PAF Reference Values 406, a PAF Tracking Values 408, a PAF Tracking Reference 410, a Legacy PC 412, a Desired SNR Filter 414, Other Filters 416, a TP Ranging Filter 418, a -(SNR Ranging) Filter 420, a combiner 422a, a combiner 422b, a combiner 422c, and a combiner 422d. The terminal power control outputs/calculates a Transmission TP 424 and a PAF TP 426.

The terminal PC 400 for controlling Power Across Frequency may add the PAF filter 402 to the legacy PC 420. In some embodiments, the terminal PC 400 may be added to a terminal. The terminal PC 400 may be managed by a gateway PC system. The PAF filter 402 may store initial PAF values 404 for each frequency bin. The PAF filter 402 may calculate PAF Tracking Values 408 for each frequency bin during operation. For a current frequency bin k (Fink), a combiner 422d may combine a respective value from the PAF Initial Values 404 and a respective value from the PAF Tracking Values 408 using, for example, an addition operation. For a current ranging frequency bin k (Fbin_ranging), a combiner 422a may combine an output of combiner 422d with a respective value from the PAF Reference Values 406, and a respective value from the PAF tracking reference values 410, for example, by subtracting the initial and tracking reference values of the reference frequency bin. In some embodiments, an output of the combiner 422a is treated as the output of PAF filter 402 and maybe named the PAF TP 426.

The PAF TP 426 may be combined with a legacy TP from the Legacy PC 412. The legacy PC may use combiners 422c and 422b to manipulate values calculated by the desired SNR filter 414, the TP ranging filter 418, the SNR ranging filter 420 and Other Filters 416 to determine the transmission TP. In some embodiments, the other filters 424 may include a STF and the ULFE controllers. The combining in the legacy PC 420 may be done with combiners 422b and 422c. In some embodiments, the transmission TP may be calculated as:

$$TP(n)=(STF(n)+ULFE(n)+TP_{ranging}(ModCod_{ramping}, symbolrate_{ranging})+c/Ndesired-c/Nranging+ PAF_{fbin_k}+PAFTRAF_{fbin_k}(n)-PAF_{fbin_{ranging}}- PAFTraF_{fbin_{ranging}})$$

Power control error may be a combination of the errors arising from the change in the link conditions and the variation across frequency. The PAF values change gradually over time unlike the link conditions. Hence, the terminal may use a filter with a long time constant to capture that change. There may be a tracking filter per frequency bin. The filter coefficients may be the same, but the state of the filter and the input/output will be different. The filter output may be reset by the terminal to zero when it goes IDLE and the PAF values reinitialized from the gateway when it goes active. The PAF TP 426 may be zero at startup and may reset itself when a gateway switch occurs, when a frequency bin reconfiguration takes place, or the like. In some embodiments, the terminal may update the PAFTraF (PAF Tracking Values 408) every frame when the terminal is active.

$$x(n)=(PCE(n)+STF(n))$$

$$y(n)=\Delta_{PAFTraf}*x(n)+y(n-1)$$

y(n)=PAFTraF(n); output of the filter
n is the nth time instant

PAF Tracking at the Gateway

Figure 5:
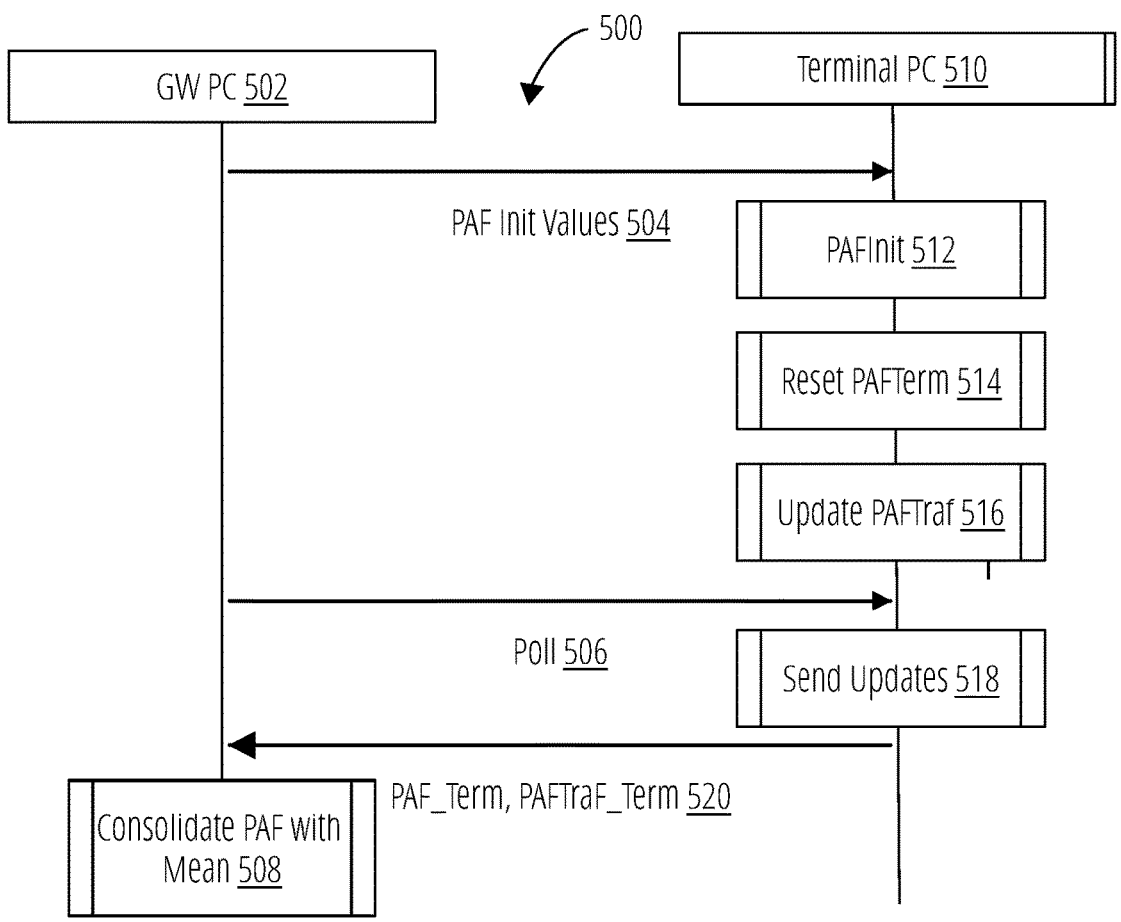
FIG. 5 illustrates a PAF update system to consolidate PAF tracking values according to various embodiments.
Figure 6:
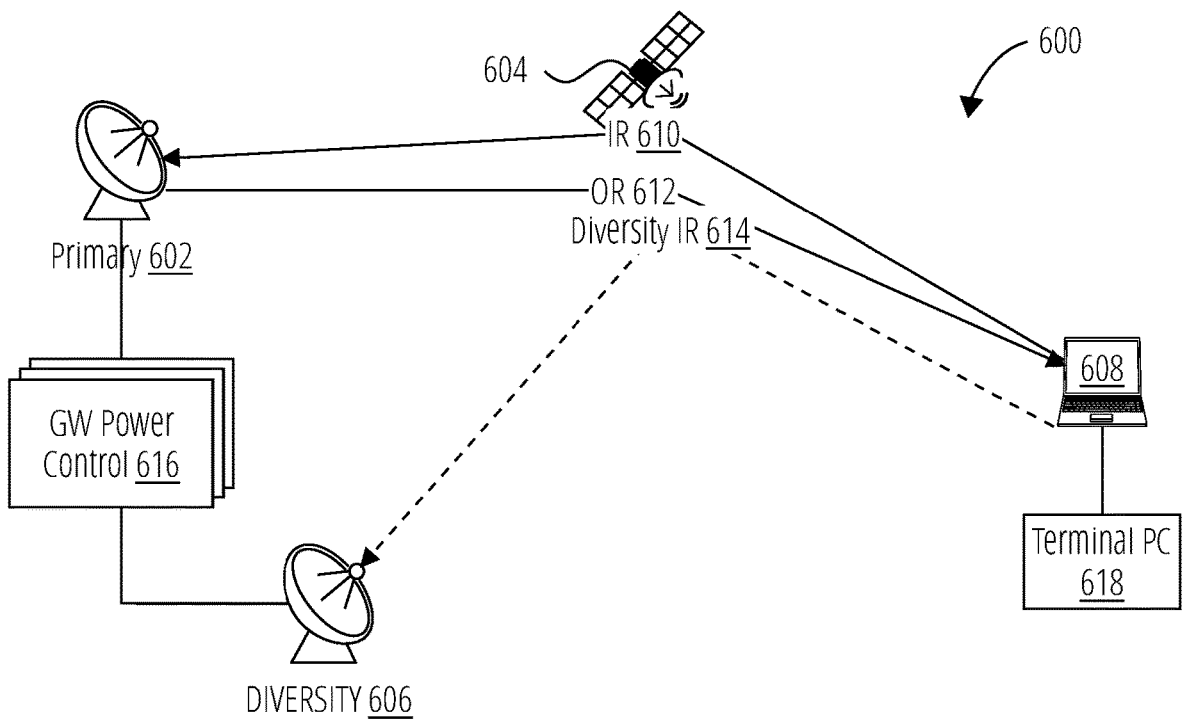
FIG. 6 illustrates power control for a gateway switchover in an aspect of the subject matter in accordance with one embodiment.

FIG. 5 illustrates a PAF update system to consolidate PAF tracking values according to various embodiments.

A PAF update system 500 to consolidate PAF tracking values of terminals may be disposed in a gateway. The PAF update system 500 may include a GW PC 502 and a terminal PC 510. Normalized PAF values by frequency bins are established as described above (see FIG. 2). Any errors in the measurement due to specific problems in Terminal PCs 510 may remain in a PAF update system 500 unless the PAF initial values are updated. Variations in the PAF tracking values at the Terminal PCs 510 may be consolidated back into the PAF initial values. In some embodiments, the Terminal PCs 510 need not save the PAF initial and PAF tracking values for a diversity GW but only for presently active gateway.

The consolidation includes the Terminal PCs 510 reporting the PAF initial and PAF tracking filter values (for example, with message 520) for each frequency bin used by the terminal to the GW PC 502, the GW PC 502 consolidating the numbers into one value per frequency bin and then updating that bin's PAF value. As the variations are expected to be slow (order of hours), the required number of simultaneous active Terminal PCs 510 and the duration that they stay active is not high.

This information may be sent as message 520 that may be a part of a current message or a new message could be created for it. The Terminal PCs 510 may send the saved PAF initial values in message 520 to the GW PC 502 to establish a reference for a variation. Once the GW PC 502 has the information the GW PC 502 may compute the mean and variance value of the set for each frequency bin in operation Consolidate PAF with Mean 508. In some embodiments, a terminal value that is an outlier may be dropped and the mean recalculated. The consolidated/updated mean may update the PAF initialization value. When the Terminal PCs 510 go active, the Terminal PCs 510 may update their PAF initialization values to the ones being broadcast in a message 504 by the gateway 510 at operation 512. In some embodiments, the terminal PCs 510 may reset their PAFTraF value to zero at operation 514 when going active. As the Terminal PCs 510 transmit they may update their PAFTraf values at operation 516. The Terminal PCs 510 may send updates at operation 518 to the GW PC 502 in response to a poll message 506 or per a periodicity or the like.

Polling PAF Tracking Information from the Gateway

In some embodiments, a gateway knows which terminals have been active and for what duration. The gateway polls random terminals who have been continuously PHY active longer than a poll active time for their PAF values. The maximum number of terminals polled may be limited. The polling may occur once every PAF poll duration. Terminals are termed PHY active if they have transmitted a burst (TDMA) recently and an associated PAF idle timer has not expired. The gateway may poll terminals for values for every frequency bin. The processing may be done per frequency bin. After the gateway has received enough (possibly all) PAF and PAFTraF values from the terminals, the gateway may update the PAF values at the gateway.

For each frequency bin fbink, k, the gateway may calculate mean value and standard deviation of the variation seen by the terminals. The gateway may then remove the values that are greater than a PAF outlier standard deviations than the mean. As such, tor each polled terminal value j, j, NO_POLLED_TERMS], the gateway may keep non-outlier values. The gateway may then recalculate the mean of the reduced set and add the calculated mean value to the existing PAF value The performance of this embodiment may depend upon the number of terminals that are active and can be polled by the gateway, the response time of the individual terminals tracking filters (for example, a PAFTRaF filter constant) and the averaging duration at the gateway. The number of active terminals available to be polled by the gateway at any one-time instant may be assumed to be Poisson distributed when each terminal is independently active or idle and the duration it stays active or idle is also independent.

The probability of the number of active terminals at any one instant depends upon the ratio of the mean values of the terminal's idle and active times, the ratio of the variance of these periods and the time duration of the interval the active terminals are looked at.

In some embodiments, the average number of active terminals available to be polled maybe around 5-6% of the terminal population when the mean idle period of the terminal is 5 times the mean active period. The average number of active terminals available to be polled maybe around 2-3% when the mean idle period of the terminal is 15 times the mean active period and continues to fall as the ratios increase. For example, given about 100 terminals per frequency bin (1000 terminals per 200 MHz with 8, 25 MHz bins), then the number of terminals that can be polled may be somewhere between 2 and 6. The number of terminals across the frequency bins at any instant may not be uniform. Some frequency bins depending on the IRs they contain can have more terminals than others. The effect of a lower active terminal count maybe higher when the PAF averaging period is lower. The RMS error may almost be 50% higher for averaging periods below 150 s.

Pushing PAF Tracking Information to the Gateway

Instead of periodically polling active terminals from the gateway at a certain instant, active terminals can report their values periodically to the gateway. All the terminals that have been active for over a certain threshold time may send their values to the gateway periodically. The gateway may use all these values in calculating the average. This allows the number of terminals that are active and can report their values to increase and a need to compute the mean value is lessened. However, the gateway has to store all the various PAF values for a period of time from multiple terminals.

Using the PAF Tracking to Initialize PAF

Measuring the PAF initialization values for every frequency bin and every gateway takes time and effort. This becomes even more cumbersome with gateway switching capabilities in the system where the combinations of measurements are even higher. To alleviate this problem, the tracking system may be used with different parameters during system initialization or startup. The time response of the PAF system is dependent on the filter constants of the PAFTraF at every terminal, and the averaging period set at the gateway. In some embodiments, the gateway may send an SNR feedback to the terminal even if the bursts are not decoded.

In PAF acquisition mode, the tracking system is adapting to a step in the PAF values instead of a variation in the IR. To respond to the step change, the PAFTraF filter constant may be increased per communications from the gateway and the averaging or mean calculations may be done more frequently at the gateway. System performance during PAF acquisition may depend on a magnitude of the step variation, and the number of terminals present in the system during startup.

The system may transition to tracking the PAF when PAF values at the gateway have stabilized. Stabilization may be assumed/detected, for example, when a change in the average PAF at the gateway averaged over the last 10 averaging periods is less than 0.1 dB. This is essentially calculating the slope of the PAF variation averaged over a certain period to make sure that the system is responding to a gradual variation rather than a step change.

Gateway Switchover

A satellite network 600 includes a primary gateway 602, a satellite 604, a diversity gateway 606, a terminal 608, an IR 610, an OR 612, a Diversity IR 614, a GW Power Control 616, and a Terminal PC 618. The terminal 608 may be connected to the primary gateway 602 by default. Rain fade or other problems may cause primary gateway 602 to be unavailable. The terminal 608 may be serviced by the diversity gateway 606 when the primary gateway 602 becomes unavailable. As such communications from the 608 may switch from the IR 610 to the Diversity IR 614. The GW Power Control 616 may communicate with the terminal PC 618 to provide power control values via the OR 612 to the terminal 608.

During periods of heavy rain fade at a gateway, a total capacity supported by the gateway may be insufficient. In some embodiments, during a time of the rain fade, the beams being served by the gateway may be switched to a backup gateway. In some embodiments, a complete Outroute (OR) and IR spectrum on the uplink may be shifted to the backup gateway. The impact on terminal uplink power control due to the switching is primarily because of the change in a Satellite to gateway link associated with the user beam. The transmit power required for a terminal to obtain signal lock with the backup gateway could be higher or lower than the transmit power before the switch occurred. The change in power would be dependent on the differences between the gateway hardware, the differences in atmospheric conditions and the differences in the satellite hardware and antennas between the two gateways. The change can impact different portions of the spectrum differently. The difference between the TP values for the primary and the backup gateway is a Power Delta (PD).

For gateway switching, the IR layout and frequency bins may be the same on the backup gateway and the primary gateway. The process of ranging to reestablish the required TP for each terminal is resource and time wasteful. Rather than ranging, a set of pre-calculated values may be used to convey a PD between the primary and backup gateways. After the terminal has switched to the backup gateway, the backup gateway may communicate the predetermined set of PD values, one for each frequency bin, to the terminal. The terminal transmit power will be changed by the amount in the PD table depending on the frequency bin associated with the IR used for transmitting. PD values may be determined by equations and corresponding tables presented previously. The PD values represent the delta between the two gateways (primary and backup) under clear sky conditions. For example, $$TP_{IR_k GW_n} = TP_{IR_k GW_m} + PD_{fbin_{IR_k}(GW_n GW_m)}$$

$TP_{IR_k GW_m}$ is the transmit power for $IR'k'$ at $GW'm'$ $IR_k$ is $kth$ Inroute $GW_n$ is the $GW$ $n$; $GW_m$ is the $GW$ $m$ The PD table may include the PD values for every combination of gateways that can be switched between. For systems where only one such combination exists, this is a manageable option but for networks having more than one combination, it becomes unmanageable very fast. In some embodiments, one diversity gateway serves as backup most of the time. However, a second diversity backup gateway can be made available with some performance loss. With just two diversity gateways at least 6 different sets of PD values may be sent out for primary gateway. If each spectrum has 50 bins, then this information quickly become hundreds of bytes which is inefficient to transmit continuously. Table 2 below illustrates an exemplary PD table.

TABLE 2

POWER DELTA (PD) TABLE

| gateway From | gateway To (when switched in for the corresponding primary) | Frequency bin | PD |
|---|---|---|---|
| 1 | 1 | 1 | a |
| 1 | 1 | 2 | b |
| 1 | ... | ... | ... |
| 1 | 2 | 1 | p |
| ... | ... | ... | ... |
| 2 | ... | ... | ... |
| M | N | ... | ... |

In some embodiments, instead of sending the complete PD table, only one value for every combination may be sent. This value can denote the difference value between the TP for the reference frequency bins for the gateways being switched between. The terminal uses this value and PAF values for each of the IRs being switched between to calculate the new transmit power required after the switch.

$$TP_{IR_k GW_n} = $$
$$TP_{IR_j GW_m} + PAF_{fbin_{IR_k GW_n}} - PAF_{fbin_{IR_j GW_m}} + PD_{(fbin_{ref}GW_n)(fbin_{ref}GW_m)}$$

The terminal may have to save the PAF value from the gateway that it is switching from. In some embodiments, each gateway may transmit only a set of PAF values belonging to it.

Creating Power Delta Table

The PD and PAF values are recorded by observing the differences in power required by a terminal to achieve a certain ModCod across frequency and between gateways. In some embodiments, a health monitor power required to achieve a certain ModCod in each IR may be captured at system startup (or initial gateway installation time or the like) using a test terminal. The same information may then be observed after switching to another gateway. The process used to calculate the PAF values may be used to calculate the PD values. The TP values from each gateway and its backup may be measured. The whole spectrum may be measured at the same time. The measured values may be stored in a Measured Transmit Power (MTP) values table, for example, Table 3 below.

TABLE 3

MEASURED TRANSMIT POWER (MTP) VALUES TABLE

| gateway | gateway 'n' (switched in for gateway 'm') | Frequency Bin | Terminal Power gateway 'm' (TP_GWm) | Terminal Power gateway 'n' (TP_GWn) | Difference in Power (PD) (switching from GWm to GWn) |
|---|---|---|---|---|---|
| 1 | 1 | 1 | a | b | b-a |
|   |   | 2 | c | d | d-c |
|   |   | 3 | e | f | f-e |
|   |   | ... | ... | ... | ... |
| 2 | 1 | 1 | ... |   |   |
|   |   | 2 |   |   |   |
|   |   | ... |   |   |   |
| 3 | 2 | ... |   |   |   |
| ... | ... |   |   |   |   |
| n | m | ... |   |   |   |

A reduced PD table, for example, table 4 below, may be calculated per switching combination needs to be performed with the exemplary equation:

$$PD_{(fbin_{ref}GW_n)(fbin_{ref}GW_m)} = TP_{fbin_{ref}GW_n} - TP_{fbin_{ref}GW_m}$$

TABLE 4

REDUCED PD TABLE

| gateway From | gateway To (when switched in for the corresponding active) | TP Ref Frequency bin (to) - TP Ref Frequency bin (From) |
|---|---|---|
| 1 | 1 | a-b |
| 1 | 2 | a-c |
| 1 | ... | ... |
| 1 | N | a-o |
| 2 | 1 | b-a |
| 2 | ... | ... |
| 2 | N | b-o |
| ... | ... | ... |
| M | 1 | m-b |

As the PAF tracking algorithm at the gateway stabilizes, the PAF variation may be added to the PD value as:

$$PD_{(fbin_{ref}GW_n)(fbin_{ref}GW_m)} = TP_{fbin_{ref}GW_n} - TP_{fbin_{ref}GW_m} + GWPAFTraF_{fbin_{ref}GW_n} - GWPAFTraF_{fbin_{ref}GW_m}$$

Figure 7:
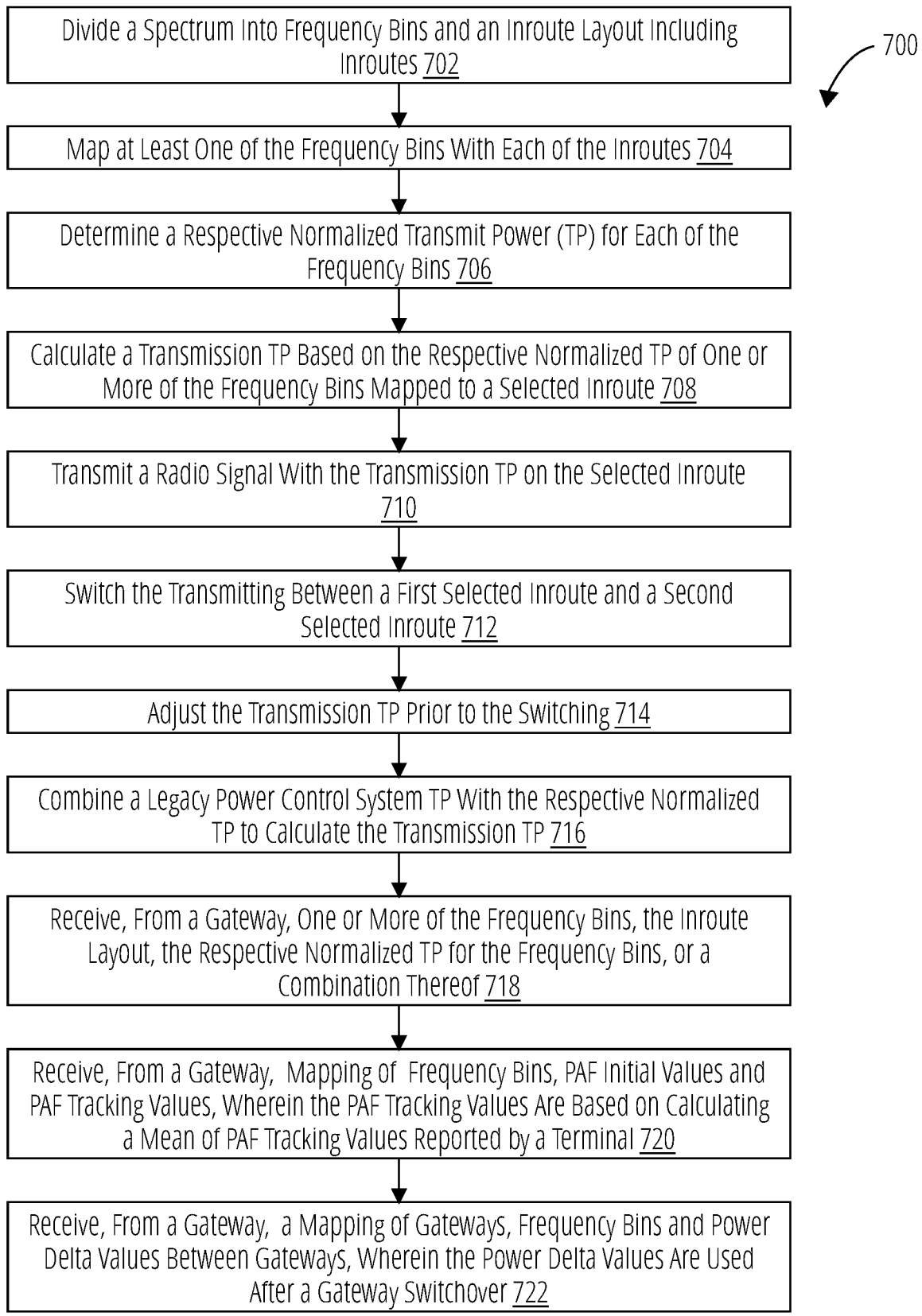
FIG. 7 illustrates a method for managing a transmit power of a terminal in accordance with one embodiment.

FIG. 7 illustrates a method for managing a transmit power of a terminal in accordance with one embodiment.

A method 700 includes block 702 that divides a spectrum into frequency bins and an inroute layout includes inroutes. In block 704, method 700 maps at least one of the frequency bins with each of the inroutes. In block 706, method 700 determines a respective normalized Transmit Power (TP) for each of the frequency bins. In block 708, method 700 calculates a transmission TP based on the respective normalized TP of one or more of the frequency bins mapped to a selected inroute. In block 710, method 700 transmits a radio signal with the transmission TP on the selected inroute. In method 700 a first frequency bin of the frequency bins is adjacent a second frequency bin of the frequency bins. In method 700 a respective normalized TP of the first frequency bin compared to a respective normalized TP of the second frequency bin varies no more than a threshold power delta. In method 700 a count of frequency bins is greater than one and unequal to a count of the inroute. In method 700 each respective normalized TP includes a Power Across Frequency (PAF) initial value for a frequency range of a respective frequency bin of the frequency bins.

Implementations of method 700 may include one or more of the following blocks. In block 712, the method 700 switches the transmitting between a first selected inroute and a second selected inroute. In block 714, the method 700 adjusts the transmission TP prior to the switching. In block 716, the method 700 combines a legacy power control system TP with the respective normalized TP to calculate the transmission TP. In block 718, the method 700 receives, from a gateway, one or more of the frequency bins, the inroute layout, the respective normalized TP for the frequency bins, or a combination thereof. In block 720, the method 700 receives, from a gateway, mapping of frequency bins, PAF initial values and PAF tracking values, wherein the PAF tracking values are based on calculating a mean of PAF tracking values reported by one or more terminals. In block 722, the method 700 receives, from a gateway, a mapping of gateways, frequency bins and power delta values between gateways, wherein the power delta values are used after a gateway switchover.

Switching to a Different IR Layout

The IR layout across the switchover gateways need not be similar. Since the values are indexed to frequency bins and not individual IRs, the PD values need not change. However, different IR to frequency bin mapping for the switchover gateways have to be provided. In some embodiments, the switchover occurs within seconds. In some embodiments, the IRs remain the same when the active terminals maintain their bandwidth allocations through the switchover.

In the reduced PD table concept, only one value per switching combination may be required. This value pertains to the reference bin for each of the two gateways separately. The frequency bin configuration could be different or the same for the switchover gateways.

Rain Fade Impact

When the gateway-satellite link is experiencing a rain fade, the outroute and inroute SNR change. However, the inroute and outroute SNR are affected differently, both the ULFE and the STF in the uplink power control may change before the switchover. It is also possible but improbable that the user beam is under fade simultaneously. when the gateway switches, the effect of the gateway-satellite link condition is removed while the satellite to terminal link impact stays the same. As such, the gateway beacon SNR value may be sent to the terminals when a fade is detected at the gateway site. The terminal may save its own power back off or transmit power value for an in-operation MOD-COD and symbol rate when the fade value is received. The change in the terminal transmit power between the time when the fade started at the gateway to the time and when the gateway switched may be the drop in the IR SNR due to the rain at the gateway site. After the switchover, the terminal may remove this offset in power before transmitting.

The terminal may load the new PAF values after switching Gateways and clear its PAF tracking filter values. A central controller, for example, network operations center, may maintain PAF and PAF tracking values for each gateway and switch them during a gateway switchover.

Inroute Layout Reconfiguration

In some embodiments, Dynamic Inroute Reconfiguration (DIR) reconfigures the layout of the IRs. DIR may involve changing the symbol rates in the layout, and the number of IRs at every symbol rate. The layout of the IRs with respect to the center frequencies will also change. This feature allows the system to deploy IRs as needed, thereby improving an efficiency of the network. With respect to a power control, just the table of assignments of IRs to frequency bins needs to be changed and redistributed to the terminals. The PAF and PD values will remain the same for the frequency bins.

Frequency Bins Reconfiguration

When the frequency bins are reconfigured, resized and redistributed, the PAF value table needs to be recalculated. Since measuring the values is very tedious, the new table may be calculated using the old measured values. The following procedure shall be used.
1. Compute the center frequencies of the old and new frequency bin sets.

$$CenterFreq_{fbin_k} = \frac{(StartFreq_{fbin_k} + EndFreq_{fbin_k})}{2}$$

Each PAF value is associated with the center frequency of the frequency bin
2. For each fbin$_k$new in the new set
   a. Find two adjacent (contiguous) frequency bins, l and (l–1) in the old set such that Center Freq$_{fbin_{(l-1)}old}$ <CenterFreq$_{fbin_k new}$<CenterFreq$_{fbin_l old}$ and abs(CenterFreq$_{fbin_{(l-1)}old}$−CenterFreq$_{fbin_l old}$)≤Fbin-Size$_{max}$old;for contiguous bins b. If two such bins are found calculate $$TP_{fbin_k new} = TP_{fbin_{(l-1)}old} + \frac{(TP_{fbin_k old} - TP_{fbin_{(l-1)}old}) * CenterFreq_{fbin_k new}}{(CenterFreq_{fbin_k old} - CenterFreq_{fbin_{(l-1)}old})}$$

else
      mark fbin$_k$new as a bin whose value needs to be measure
   c. Calculate the PAF values by taking the difference from the TP value of the reference frequency bin PAF$_{fbin_k new}$=TP$_{fbin_k new}$−TP$_{fbin_{ref} new}$ If a new portion of spectrum is made available for use, then a measurement to capture the TP value for that frequency bin is needed before its PAF value can be calculated.

Having described preferred embodiments of a system and method (which are intended to be illustrative and not limiting), it is noted that modifications and variations can be made by persons skilled in the art considering the above teachings. It is therefore to be understood that changes may be made in the embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for managing a transmit power of a terminal, the method comprising:
dividing a spectrum into frequency bins and an inroute layout comprising inroute;
mapping at least one of the frequency bins with each of the inroute;
determining a respective normalized Transmit Power (TP) for each of the frequency bins;
calculating a transmission TP based on the respective normalized TP of one or more of the frequency bins mapped to a selected inroute; and
transmitting a radio signal with the transmission TP on the selected inroute,
wherein a first frequency bin of the frequency bins is adjacent a second frequency bin of the frequency bins,
a respective normalized TP of the first frequency bin compared to a respective normalized TP of the second frequency bin varies no more than a threshold power delta,
a count of frequency bins is greater than one and unequal to a count of the inroute layout, and
each respective normalized TP comprises a Power Across Frequency (PAF) initial value for a frequency range of a respective frequency bin of the frequency bins.

2. The method of claim 1, wherein the threshold power delta ranges from 0.2 decibel (dB) to 0.8 dB and a power difference across a PAF curve of the frequency range of each of the frequency bins is within 0.0 dB to 0.5 dB.

3. The method of claim 1, wherein the determining comprises calculating the PAF initial value as a mean of a PAF curve for the frequency range of the respective frequency bin.

4. The method of claim 1, wherein the selected inroute is mapped to a plurality of the frequency bins and the calculating of the transmission TP combines each of the respective normalized TPs of the plurality of the frequency bins.

5. The method of claim 1, further comprising:
switching the transmitting between a first selected inroute and a second selected inroute; and
adjusting the transmission TP prior to the switching,
wherein the selected inroute comprises the first selected inroute and the second selected inroute,
the radio signal comprises a first portion transmitted via the first selected inroute and a second portion transmitted via the second selected inroute; and
at least one of the frequency bins mapped to the first selected inroute is different than at least one of the frequency bins mapped to the second selected inroute.

6. The method of claim 1, further comprising combining a legacy power control system TP with the respective normalized TP to calculate the transmission TP.

7. The method of claim 1, wherein the respective normalized TP for each of the frequency bins comprises a PAF tracking value to counter differences between the respective PAF initial value, a terminal PAF and a variation during operation.

8. The method of claim 1, wherein the respective normalized TP for each of the frequency bins comprises a relative TP from a reference frequency bin of the frequency bins.

9. The method of claim 1, wherein the inroute layout, the frequency bins or a combination thereof are reconfigured during system operation.

10. The method of claim 1, further comprising receiving, from a gateway, one or more of the frequency bins, the inroute layout, the respective normalized TP for the frequency bins, or a combination thereof.

11. The method of claim 1, further comprising receiving, from a gateway, mapping of frequency bins, PAF initial values and PAF tracking values, wherein the PAF tracking values are based on calculating a mean of PAF tracking values reported by a terminal.

12. The method of claim 1, further comprising:
collecting, at a gateway, a plurality of PAF tracking value for each of the frequency bins; and
computing a mean of the plurality of PAF tracking values for each of the frequency bins.

13. The method of claim 12, wherein the gateway polls an active terminal for its PAF tracking values and calculates mean tracking values.

14. The method of claim 12, further comprising setting the PAF initial value of a respective frequency bin based on a respective computed PAF tracking value and subsequently resetting the respective computed PAF tracking value.

15. The method of claim 1, further comprising receiving, from a gateway, a mapping of gateways, frequency bins and power delta values between gateways, wherein the power delta values are used after a gateway switchover.

16. A computing apparatus comprising:
a processor; and
a memory storing instructions that, when executed by the processor, configure the apparatus to:
divide a spectrum into frequency bins and an inroute layout comprising inroute;
map at least one of the frequency bins with each of the inroute;
determining a respective normalized Transmit Power (TP) for each of the frequency bins;
calculate a transmission TP based on the respective normalized TP of one or more of the frequency bins mapped to a selected inroute; and
transmitting a radio signal with the transmission TP on the selected inroute,
wherein a first frequency bin of the frequency bins is adjacent a second frequency bin of the frequency bins,
a respective normalized TP of the first frequency bin compared to a respective normalized TP of the second frequency bin varies no more than a threshold power delta,
a count of frequency bins is greater than one and unequal to a count of the inroute layout, and
each respective normalized TP comprises a Power Across Frequency (PAF) initial value for a frequency range of a respective frequency bin of the frequency bins.

17. The computing apparatus of claim 16, wherein threshold power delta ranges from 0.2 decibel (dB) to 0.8 dB and a power difference across a PAF curve of the frequency range of each of the frequency bins is within 0.0 dB to 0.5 dB.

18. The computing apparatus of claim 16, wherein the selected inroute is mapped to a plurality of the frequency bins and the calculating of the transmission TP combines each of the respective normalized TPs of the plurality of the frequency bins.

19. The computing apparatus of claim 16, wherein the instructions further configure the apparatus to:
switch the transmitting between a first selected inroute and a second selected inroute; and
adjust the transmission TP prior to the switching,
wherein the selected inroute comprises the first selected inroute and the second selected inroute, the radio signal comprises a first portion transmitted via the first selected inroute and a second portion transmitted via the second selected inroute; and at least one of the frequency bins mapped to the first selected inroute is different than at least one of the frequency bins mapped to the second selected inroute.

20. The computing apparatus of claim 16, wherein the instructions further configure the apparatus to:

collect, at a gateway, a plurality of PAF tracking value for each of the frequency bins;

compute a mean of the plurality of PAF tracking values for each of the frequency bins; and set the PAF initial value of a respective frequency bin based on a respective computed PAF tracking value and subsequently resetting the respective computed PAF tracking value.

\* \* \* \* \*